United States Patent
Bicakci (10) Patent No.: US 6,741,289 B1
(45) Date of Patent: May 25, 2004

(54) TECHNIQUE TO STABILIZE THE CHROMINANCE SUBCARRIER GENERATION IN A LINE-LOCKED DIGITAL VIDEO SYSTEM

(75) Inventor: Ara Bicakci, San Jose, CA (US)

(73) Assignee: Fairchild Semiconductors, Inc., South Portland, ME (US)

( * ) Notice: Subject to any disclaimer, the term of this patent is extended or adjusted under 35 U.S.C. 154(b) by 631 days.

(21) Appl. No.: 09/703,517

(22) Filed: Oct. 31, 2000

(51) Int. Cl.$^7$ ................................................ H04N 9/45
(52) U.S. Cl. ........................ 348/505; 348/194; 348/508
(58) Field of Search ................................. 348/194, 505, 348/508, 512, 549; 386/41, 13, 17, 19, 20

(56) References Cited

U.S. PATENT DOCUMENTS

| | | | |
|---|---|---|---|
| 4,370,672 A | * 1/1983 | Ross et al. | 358/312 |
| 4,639,780 A | * 1/1987 | Willis | 358/150 |
| 4,694,327 A | * 9/1987 | Demmer et al. | 358/19 |
| 4,697,207 A | * 9/1987 | Lilley | 358/17 |
| 4,718,074 A | 1/1988 | Mannas et al. | 375/118 |
| 4,987,491 A | 1/1991 | Kaite et al. | 358/166 |
| 4,989,073 A | * 1/1991 | Wagner | 358/19 |
| 5,132,554 A | 7/1992 | Hiramatsu et al. | 307/269 |
| 5,179,438 A | * 1/1993 | Morimoto | 358/17 |
| 5,280,345 A | 1/1994 | Uehara et al. | 358/37 |
| 5,303,061 A | 4/1994 | Matsumoto et al. | 358/320 |
| 5,359,366 A | 10/1994 | Ubukata et al. | 348/536 |
| 5,497,200 A | 3/1996 | Otaki et al. | 348/497 |
| 5,557,335 A | 9/1996 | Oh | 348/512 |
| 5,796,796 A | 8/1998 | Wang | 375/372 |
| 5,877,640 A | 3/1999 | Geerlings | 327/141 |
| 5,999,226 A | 12/1999 | Choi | 348/564 |
| 6,256,003 B1 | 7/2001 | Tsuchiya et al. | 345/87 |
| 6,310,653 B1 | * 10/2001 | Malcolm, Jr. et al. | 348/537 |
| 6,363,129 B1 | 3/2002 | Agazzi | 375/355 |

* cited by examiner

Primary Examiner—Victor R. Kostak
(74) Attorney, Agent, or Firm—Haverstock & Owens LLP (57) ABSTRACT

A technique to stabilize subcarrier generation in a line-locked digital video system, caused by simultaneous locking of the genlock device causing continuous changing of a shared clock signal, by calculating a time shift occurring in an output waveform, converting the time shift into an equivalent phase shift and sending a corresponding phase correction number to a waveform generator block to correct the time shift, and thus stabilize subcarrier generation.

45 Claims, 5 Drawing Sheets

TECHNIQUE TO STABILIZE THE CHROMINANCE SUBCARRIER GENERATION IN A LINE-LOCKED DIGITAL VIDEO SYSTEM

FIELD OF THE INVENTION

The present invention relates to the field of line-locked video systems. More particularly, the present invention relates to the field of correcting phase shift in a chrominance subcarrier caused by the system in the process of genlocking.

BACKGROUND OF THE INVENTION

A line-locked video system is a digital system that acquires a line-by-line analog signal. An example of such a system would be a video decoder. Each line signal acquired by the system contains a synchronizing pulse and a "color burst," neither of which carry information that is displayed on the screen. The synchronizing pulse is utilized so that a genlock PLL can locate the analog signal and lock onto it. The "color burst" is a series of eight cycles at the subcarrier frequency which appear in blanking intervals for synchronizing the television receiver to the chrominance signal. The display portion of the signal is transferred after both the synchronizing pulse and the "color burst" portion of the signal. Due to the continuous changing of the clock(CLK) signal from the genlocking step, disturbance is usually created in the chrominance subcarrier PLL which will result in a phase shift and consequently in color stripe artifact. A more detailed background description is set forth below.

The composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used by a phase-locked loop to synchronize the system for displaying the next horizontal line of video information. The burst signal is used to synchronize the phase and frequency of a local oscillator to that of the encoding oscillator so that color information can be "decoded" into its baseband color differential components.

A video picture or frame is made up of a number of horizontal lines included within the video display. To display a video picture or frame the video system begins at the top of the screen and displays the information within the composite video signal one horizontal line at a time. The information for each horizontal line is contained within a horizontal period of the composite video signal. After each horizontal period, the video system moves to the next line and displays the information within the next horizontal period of the composite video system. This continues until the video system reaches the bottom line on the video display. After displaying the video information on the bottom line of the video display, the video system must reset itself to the top of the display in order to begin displaying the next frame. In order to allow the system to reset itself to the top of the video display, a vertical blanking period is included within the composite video signal after the video information for each frame. This vertical blanking period allows the video system to reset to the top of the video display and begin displaying the information for the horizontal lines of the next frame. Therefore, a number of horizontal periods, enough to comprise a frame or screen, are strung together, within the composite video signal. Between each frame, the composite video signal includes a vertical blanking period which allows the video system to perform a vertical reset and prepare to display the next frame by moving back up to the top of the video display.

In this type of system, a genlock PLL device is used to lock and align with the synchronizing pulse portion of the signal. In the receiver portion of this system, a chrominance subcarrier PLL is utilized to detect and lock onto the "color burst" portion of the analog signal. These two PLLs share a common CLK signal. When the genlock PLL locks and aligns the video signal, the CLK is adjusted accordingly. Because of this arrangement, the problem which is readily encountered is a phase shift disturbance of the SINE wave in the chrominance subcarrier PLL in the receiver. This disturbance is caused by the simultaneous locking of the genlock device, thereby causing continuous changing of the CLK signal.

SUMMARY OF THE INVENTION

The technique described in this patent application, to stabilize the chrominance subcarrier generation in a line-locked digital video system, includes several steps. This technique includes calculating a time shift occurring in an output waveform, converting that time shift into an equivalent phase shift and finally sending a phase correction number to a waveform generator block according to the equivalent phase shift.

First, the time shift in the output waveform is calculated. This is done by first calculating a DELT value which is representative of the amount of time the output waveform is shifted.

DELT is calculated by multiplying the sum of a sequence of digital numbers outputted by the limiter with the delay value of one delay element. This relationship is given by:

$$DELT = B * TAU$$

where B is the sum of the limiter outputs and TAU is the delay value of one delay element.

Secondly, the average period of the output waveform TAV is calculated. This relationship is given by:

$$TAV = (2^m / F2) * ((32 - Q) * TAU)$$

where TAU again is the delay value, F2 is the frequency control number from the subcarrier phase locked loop, Q is a representation of the average value of the clockout period and m is the number of bits stored in the register of the waveform generator block.

The next step this technique implements is to convert the time shift to an equivalent phase shift of the output waveform or DELP. This relationship is given by:

$$DELP = Fracof((B * F2) / (2^m * (32 - Q))) * 360.$$

this formula, the term Fracof represents the fractional cycle shift.

The last step is to send a phase correction number, represented by PHQ to the waveform generator block according to the calculated value of DELP. This relationship is given by:

$$PHQ = Fracof*((-B * F2) / (2^m * (32 - Q))) * 2^k.$$

In this representation, the value of k is the number of bits in the look up table of the waveform generator block. The phase correction number will remove the phase shift from the output waveform for each video line.

DETAILED DESCRIPTION OF A PREFERRED EMBODIMENT

Figure 1:
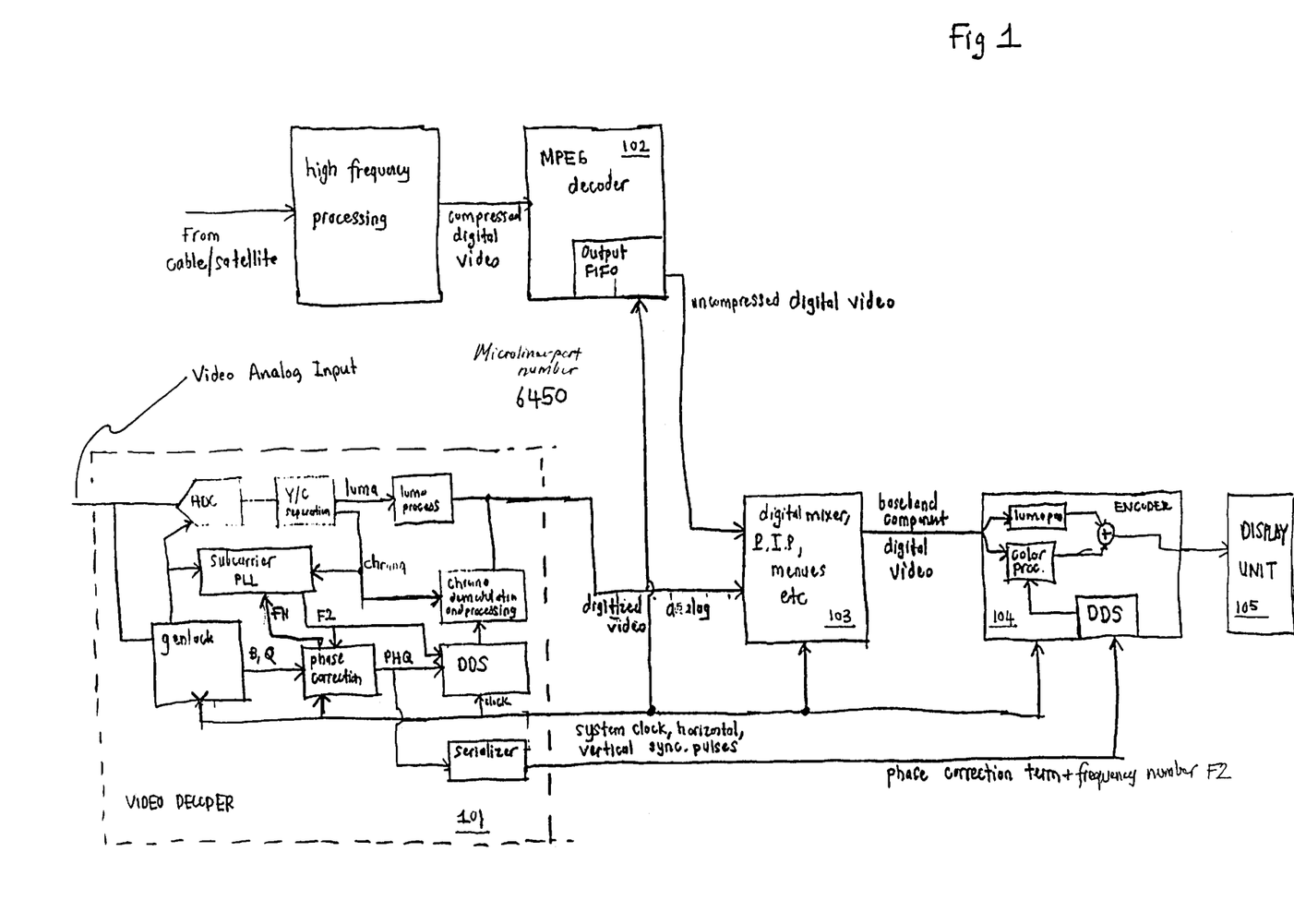
FIG. 1 illustrates a block schematic diagram of a simplified cable/satellite set top box with an extra analog input including an embodiment of the present invention.

In the preferred embodiment of the present invention, the system shown in FIG. 1 represents a simplified cable/satellite set-top box. It consists of a video decoder 101 which digitizes and conditions the analog input signal, an MPEG decoder 102 which decompresses the digital cable/satellite video stream, a mixing/overlay circuitry 103 which combines the two for picture-in-picture, overlaying menus, fading, etc., or simply switches from one to the other, and finally a digital video encoder 104 which takes the combined digital output of the overlay circuitry 103, converts it into the analog composite video format, which is then sent to a display unit 105. The system clock for the overlay circuitry 103, the digital video encoder 104 and the back-end of the MPEG decoder 102 is provided by the genlock circuitry embedded inside the video decoder. Before any mixing can be performed of the digital MPEG stream and the digitized analog video, the two must be synchronized horizontally and vertically.

In a line-locked system this is achieved by letting the genlock circuitry modulate the system clock until the video decoder 101, MPEG decoder 102 and the digital video encoder 104 are all lined-up with the analog source. Strictly speaking, locking of the encoder is usually done through the horizontal and vertical sync and locking of the decoder to the analog source is done by modulating the system clock. With a noisy analog video source such as a VCR, this lock-up process requires continuous adjustments as the time-base of the oncoming video changes. This requires the system clock to be sped up or slowed down as appropriate. The main problem with modulating the clock is in the chrominance subcarrier generation blocks which are used both inside the video decoder 101 and the digital video encoder 104. The one in the video decoder 101 locks up to the chrominance subcarrier of the received analog video to demodulate the high frequency chrominance into its base-band color difference signals.

The chrominance subcarrier generation block in the digital video encoder 104 does the opposite and modulates the base-band color difference signals into a high frequency chrominance signal. Almost universally, a Direct-Digital-Synthesis (DDS) approach (FIG. 6) is used to generate the chrominance subcarrier in both the video decoder 101 and the digital video encoder 104. In this approach, the frequency and phase of the generated sinusoid waveform is a direct function of the system clock. Therefore, modulations in system clock results in phase shifts in the generated subcarrier waveform. This translates into very objectionable color artifacts, especially at the top of the screen. The subcarrier PLL inside of the video decoder 101 compensates to some degree for chroma subcarrier phase and frequency drifts due to very slowly varying or steady-state errors in the time base of the oncoming analog video. In that sense, it is beneficial to slave the DDS inside of the digital video encoder 104 to the one inside of the video decoder 101, i.e. force the the same frequency control number F2 to both.

However, the subcarrier PLL's are designed to have very small bandwidths in order to minimize jitter in the color subcarrier. Therefore, they can not correct color subcarrier phase shifts due to rapid changes in the analog video time base, such as in the case of VCR headswitches or tape wobbles. One potential solution to this problem will be to periodically reset the phase of the subcarrier. This will, however, require a reset signal with a very stable time basis. Since the unstable system clock can not be use, a separate crystal driven reset ciruciry will be needed, thus complicating the overall system.

Figure 1A:
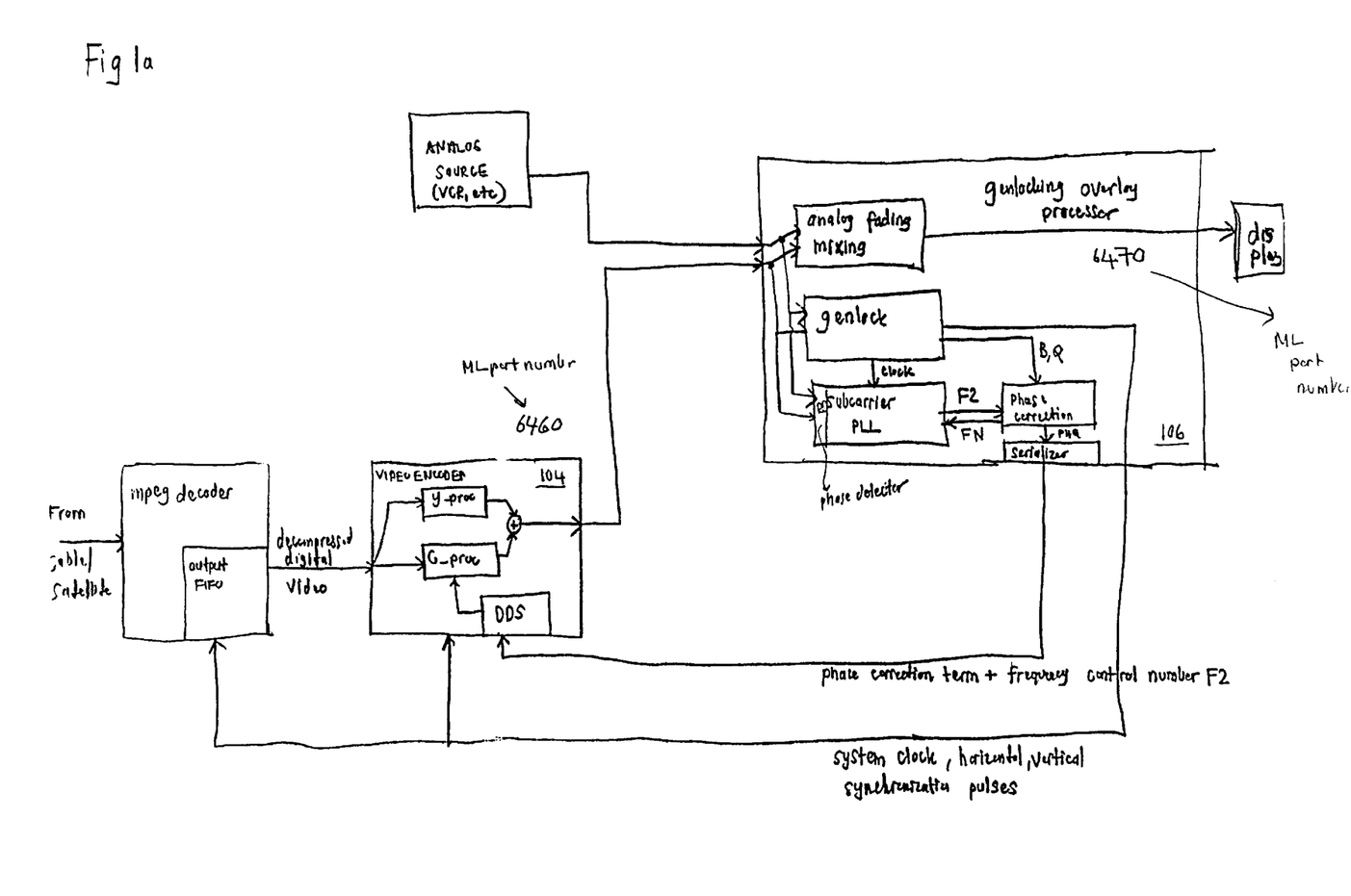
FIG. 1a illustrates a block schematic diagram of a digital and analog video mixing scheme including an embodiment of the present invention.

An alternative embodiment is shown in FIG. 1 a. Here the mixing is done in the analog domain. There is only one DDS, namely, the one in the video encoder 104. The subcarrier PLL is in the genlocking overlay processor 106. A phase detector measures the relative phase of the subcarrier coming from the encoder to the one in the analog source. The frequency number F2 is dynamically updated (once per line) by the subcarrier PLL and sent to the encoder to lock the two subcarriers. Similar to FIG. 1, a phase correction term is sent to compensate for analog video time base variations.

In the preferred embodiment of the present invention, the effect of system clock modulation on the phase of subcarrier generation is calculated and a phase correction term is applied to both the waveform generator block (DDS) inside the video decoder 101 and the one inside the digital video encoder 104. To track slowly varying time base errors, the frequency control number F2 from the subcarrier PLL inside of the video decoder 101 is also sent.

Also in the preferred embodiment of the present invention, the clock generator 206 and the waveform generator 216 may be located in separate integrated circuits.

In such instances, it is desirable to have a technique which will simplify the interface between the two chips and yet continue to remove any phase shifts caused in the output waveform due to the modulation of the CLOCKOUT as a result of time base variations in the video source 200. This new technique consists of accurately measuring, for each video line, the amount of phase distortion caused in the OUTPUT WAVEFORM as the time base of the video source 200 varies and sending once per video line a correction term which will undo this distortion. Since this correction term has to be sent at the low line rate and does not require synchronization to CLOCKOUT, it can be serialized in the serializer 219 and a single wire between the two chips can be used to serially transmit it once per video line.

Figure 2:
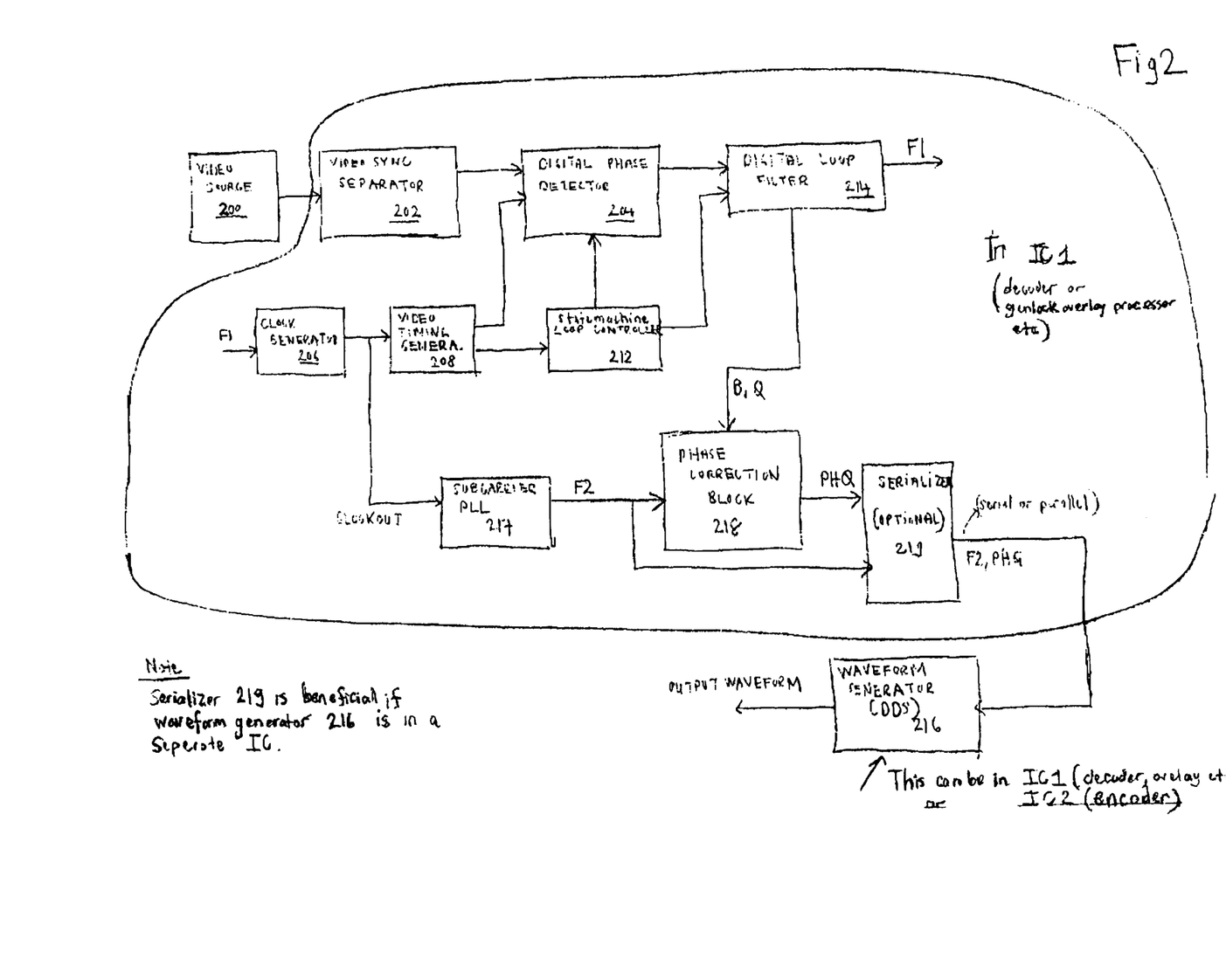
FIG. 2 illustrates a block schematic diagram of the preferred embodiment of the present invention.
Figure 3:
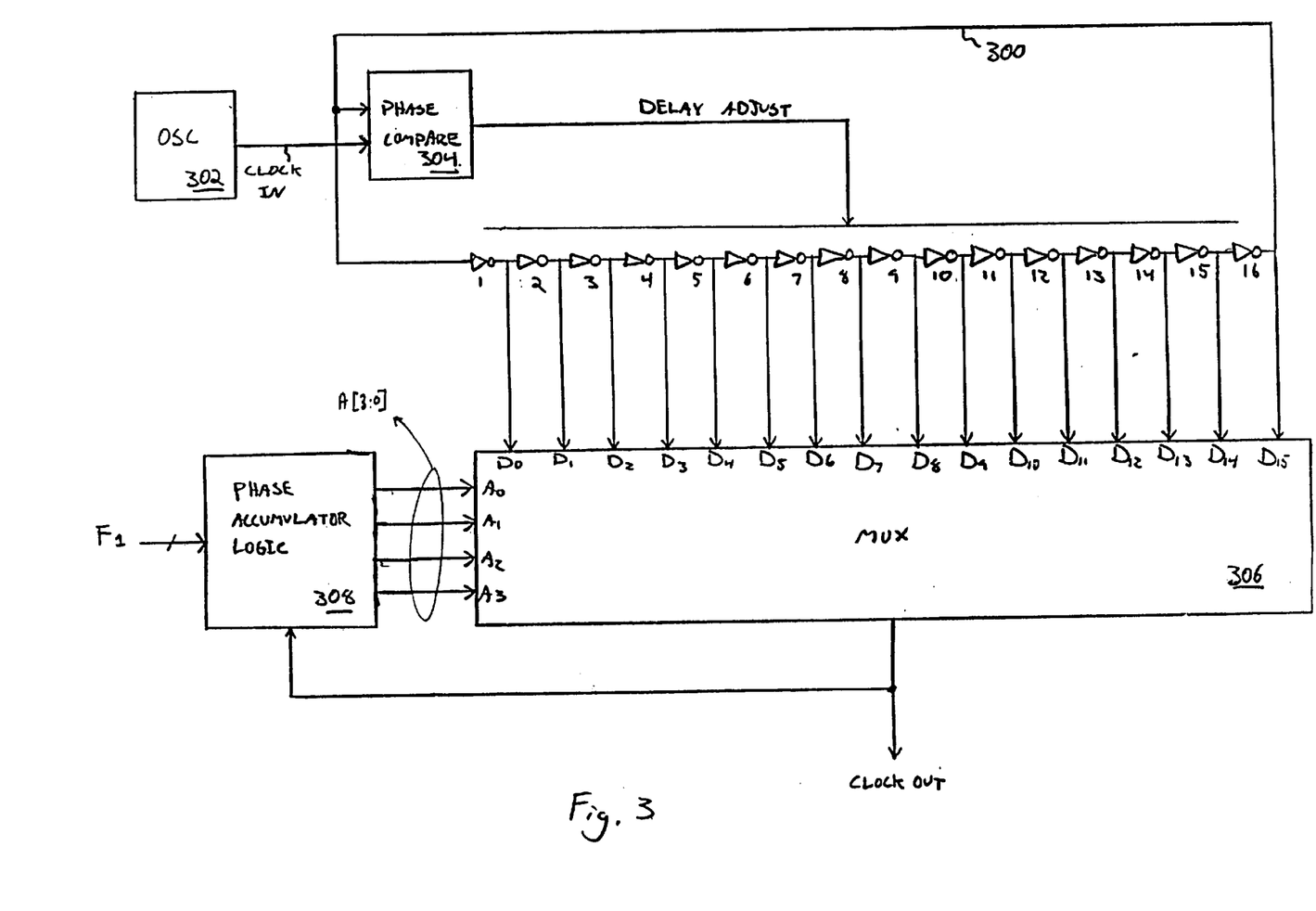
FIG. 3 illustrates a block schematic diagram of a clock generator circuit of the present invention.

In order to implement this new technique the architecture shown in FIG. 2 and FIG. 3 is modified such that the amount of time correction made by the digital loop filter 214 can be computed. Specifically, the digital loop filter 214 and the phase accumulator logic 308 are combined into a single block shown in FIG. 4.

FIG. 3 illustrates a block schematic diagram of the clock generator circuit 206 illustrated in FIG. 2. A group of sixteen delay elements 1–16 form a ring oscillator 300. Thus, the delay elements 1–16 are series-coupled in a ring such that an output of the last delay element 16 is coupled to an input of the first delay element 1. Preferably, each of the delay elements 1–16 has an identical throughput delay, one to the other. According to the preferred embodiment, all the delay elements 1–16 are simultaneously manufactured in a single integrated circuit so that any manufacturing process induced variations in throughput delay will be identical in each of the delay elements 1–16. A clock signal CLOCK IN generated by an oscillator 302 is applied to a first input of a phase comparator 304 while the output of the last delay element 16 is coupled to a second input of the phase comparator 304. An output DELAY ADJUST of the phase comparator 304 is coupled to adjust an amount of delay for each delay element 1–16. An output of each delay element 1–16 is coupled to a respective input $D_0$–$D_{15}$ of a multiplexor 306.

The oscillator 302 is preferably a crystal oscillator for ensuring accuracy and stability of the clock signal CLOCK IN and can include a divide-by circuit for reducing the frequency of the clock signal CLOCK IN from the crystal frequency. Therefore, the clock signal CLOCK IN has a precisely controlled frequency. The clock signal CLOCK IN is compared by the phase comparator 304 to the signal emerging from the last delay element 16. The phase comparator 304 simultaneously adjusts the delay of all the delay elements 1–16 such that the combined delay for all the delay elements 1–16 is equal to one cycle of the clock signal CLOCK IN. Therefore, each input $D_0$–$D_{15}$ of the multiplexor 306 has the same frequency as the clock signal CLOCK IN, but a unique phase. The last input $D_{15}$ has the same phase as the clock signal CLOCK IN.

Because there are sixteen delay elements, sixteen different clock phase signals are available, however, a different number of delay elements can be utilized if desired. Further, if rising and trailing edges are both utilized, then thirty-two different clock phase signals are available. FIG. 3 illustrates a phase-locked loop for controlling the delay of the delay elements 1–16. It will be apparent that other means may be utilized for controlling the delay of the delay elements 1–16, such as a frequency locked loop or a delay locked loop. Referring to FIG. 3, a delay locked loop can be implemented by coupling the input of the first delay element 1 to the first input of the phase comparator 304 (along with the clock signal CLOCK IN) rather than coupling the input of the first delay element 1 to the second input of the phase comparator 304.

The digital sequence generated by the digital phase detector 204 represents the time base error associated with a portion of the video signal corresponding to the sync pulse. For each sync pulse the associated error, i.e. the time difference between the actual sync location determined by the video source 200 and the expected sync location determined by the video timing generator 208, is processed in the loop filter and depending on the polarity of the error and the gains used in the loop filter (FIG. 4), the CLOCKOUT is sped up or slowed down for an appropriate amount of time. This reduces, and at steady state, eliminates the time base error between the video source 200 and the video timing generator 208. However, since the CLOCKOUT or some integer divisor of the CLOCKOUT is also used in the waveform generator 216 to synthesize the OUTPUT WAVEFORM, the amount of reduction DELT in the time base error achieved by modulating CLOCKOUT will also cause a shift in the OUTPUT WAVEFORM. In the case where video source 200 has large time base errors such as a VCR which can have microseconds of error at the beginning of each video field, the phase of the OUTPUT WAVEFORM, which is typically a sine wave with a constant frequency used to demodulate color information (in the case of a decoder) or modulate it (in the case of an encoder), will be randomized. In other words, as the time base errors are corrected, the color shifts will occur, especially at the top of the screen. Similar color shifts will also occur if the genlock circuitry modulates the system clock to track VCR wobbles.

Figure 4:
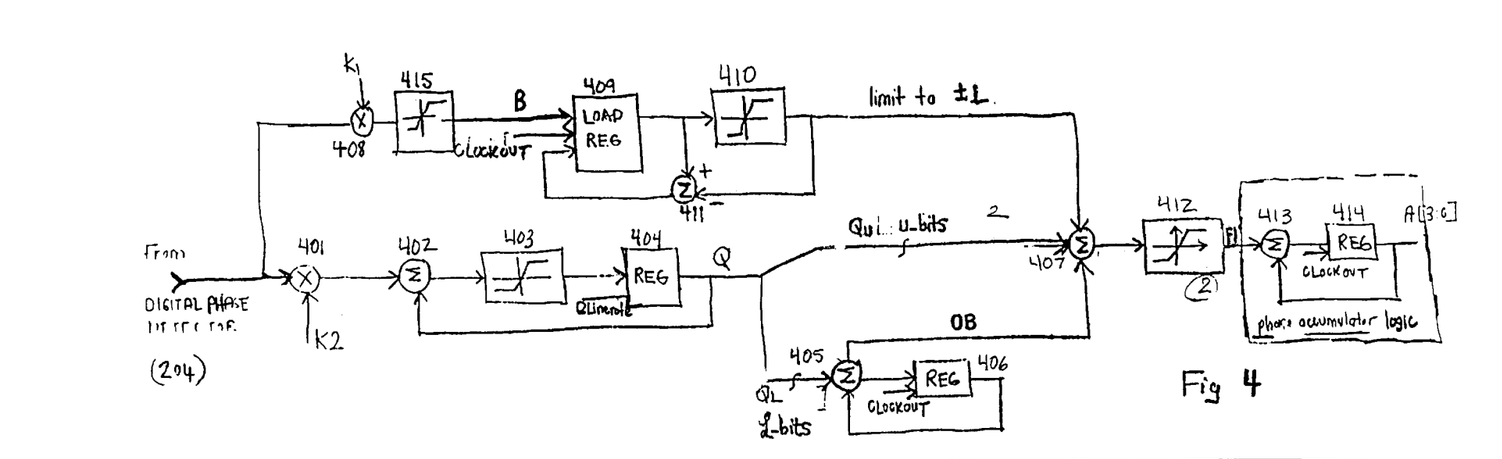
FIG. 4 illustrates a block schematic diagram of a digital loop filter and a phase accumulator logic of the present invention.

The loop filter shown in FIG. 4 consists of two paths. In path 1 (K2 path), which contains the blocks 401, 402, 403, 404, 405 and 406, the phase errors coming from the digital phase detector 204 are scaled through multiplication with a constant K2, added to the previous value of the accumulated phase errors and limited to prevent overflow. Hence for a given video line the output of the register 404 contains the running sum of the timing errors for all the previous lines up to the current line and effectively provides memory to the digital loop filter. Since the output of register 404 is determined by the sum of phase errors over a long period of time and the loop is closed through the loop filter and the phase accumulator logic in FIG. 4, the CLOCKOUT from the MUX 306, the video timing generator 208, the digital phase detector 204, the output of the register 404 forms a representation of the average value of CLOCKOUT. The upper u-bits QU go directly to the adder 407 and constitute the integer part. The lower 1-bits QL go to an accumulator block consisting of adder 405 and register 406. The overflow bit OB of adder 405 goes to adder 407. Therefore, the lower 1-bits QL constitute the fractional part of the representation of the average value of CLOCKOUT period. The number of bits u+1 used to represent the number Q determines how accurately CLOCKOUT can be synthesized using the phase accumulator 308, the MUX 306 and the phases available from the ring oscillator. In our implementation, 20 bits are used to represent Q. The integer part QU uses u=3 bits, while the fractional part QL uses 1=17 bits.

Assuming a 16 element ring oscillator driven by a stable external oscillator 302 as shown in FIG. 3 and using 16 phases available, the average period of CLOCKOUT is given by:

$$TCLOCKOUT=(32-Q/32)*TCLKIN=((32-Q)/32)*TCLKIN=((32-Q)/32)*32*TAU$$

where the integer portion of Q is represented in binary as QU(u) QU(u−1), QU0, and the fractional portion of Q is represented in binary as QL(1) QL(1−1), QL0. TAU corresponds to the delay of one delay element which is assumed to be uniform.

The number of taps used in the ring oscillator determines the phase granularity of the resulting CLOCKOUT. More taps will give a CLOCKOUT with less jitter. Formula (1) above must be modified appropriately for a ring oscillator using more taps. In one embodiment, FCLKIN=50.625 MHz. This gives TCKLIN=19.75 Ns, TAU=600 Ps. The nominal value for Q=2.00, which gives the nominal FCLOCKOUT=54 MHz.

In contrast to the K2 path which has memory and holds a representation of the average value of CLOCKOUT, the K1 path which consists of 408, 415, 409, 410 and 411 has no memory and responds to the instantaneous value of the time base error for a given line. For each video line, the time base error from the digital phase detector 204 is scaled through multiplication with a constant K1. The output of the multiplier is limited at limiter 415 such that the amount of time base error that the K1 path acts on is restricted to a value which can be corrected in one video line. The resulting number B is loaded into a register 409. Then, for each CLOCKOUT the output of the register 409 is limited at the limiter 410 to +/−L, the unlimited output is subtracted from the limited output and the result at the output of 411 is reloaded into register 409. This process continues until the output of 409 becomes less than +/−L. Thus, the sequence of digital numbers at the output of the limiter 410 will consist of an appropriate number of +/−L's and a last number whose absolute value is less than L such that the sum of all numbers in the sequence adds up to B (e.g., for B=11 and L=2, the sequence will be 2, 2, 2, 2, 2, 1, 0, 0, 0 . . . ). The output of the limiter 410 is added to the upper bits of Q and the overflow bit OB at the adder 407. The result of the addition after being limited at the limiter 412 to prevent underflow is applied to the phase accumulator which consists of adder 413 and the register 414. The output of register 414 goes to the ring oscillator and chooses one of the 16 available phases. The limit L is chosen to be the nominal value of the integer part of Q. Therefore, in our implementation, L=2. This means that for L=0, the CLOCKOUT is at its nominal frequency. For L=2, CLOCKOUT will be running approximately 6% faster and for L=−2, it will be running approximately 6% slower.

Each number x in the digital sequence at the output of the limiter 410 will cause the phase accumulator to choose a tap which is x ahead (if x>0) or −x behind (if x<0) of what would have been normally chosen. Since a jump of x taps corresponds to a time shift of x*TAU, the total time shift caused by the K1 path will simply be DELT=B*TAU. In the current embodiment, the polarities are adjusted so that B>0 if the sync pulse from the video source 200 comes sooner than expected and B<0 if the sync pulse comes later than expected. In the former case, the loop filter will cause the CLOCKOUT to speed up and in the latter case it will cause it to slow down. The effect of this speeding up and slowing down of the CLOCKOUT will be to advance or delay the whole constellation of pulses generated by the video timing generator 208 and in particular the sync pulse by an amount DELT so that the video source 200 and the video timing generator 208 can be aligned. For a given timing error on a video line, DELT will depend both on the K1 and K2 paths. However to maintain loop stability, K1/K2 ratio is chosen to be very large (larger than $2^{16}$). That means that the effect of K2 path can be to a great extent ignored and the time base correction DELT introduced by the digital loop filter will be determined by the K1 path, i.e. mathematically:

$$DELT=B*TAU \qquad (2)$$

Note that in the current embodiment the limiter 410 is designed such that an addition of +/−L at the adder 407 will cause the CLOCKOUT to run about +/−6% of nominal.

Time base correction will be performed in the appropriate direction as long as the numbers in the digital sequence at the output of the limiter 410 are non-zero. In one video line, depending on the video standard there will be a nominal number NN of CLOCKOUT pulses. Since for each CLOCKOUT, there can be a time base correction of L*TAU, the maximum time base correction in one line will be given as NN*L*TAU. For example, in case of NTSC and CLOCKOUT nominally at 54 MHz, the number of CLOCKOUT's per line will be NN=858*4=3432. Thus, with L=2 and TAU=600 ps, the maximum time base correction which can be achieved from the K1 path will be 3432*2*600 ps=4.2 us. This limitation is of no serious consequence, since even a very severe head-switch of 12 us can be compensated for in only three lines.

Thus, to ensure the validity of equation (2) above, the limiter 415 must be designed such that its output B is always less than NN*L.

Figure 5:
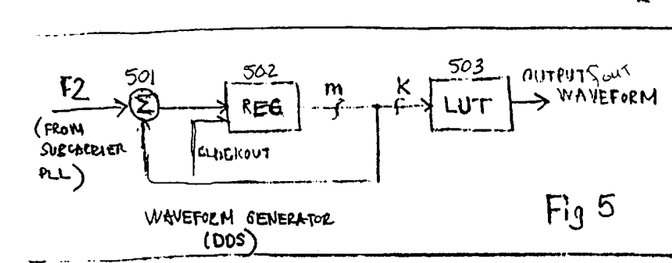
FIG. 5 illustrates a block schematic diagram of a waveform generator(DDS) of the present invention.

Also in the preferred embodiment, the DDS is shown in FIG. 5. The frequency number F2 is applied to the first input of an adder 501. The output of the adder is coupled to a register 502. This register is clocked by the signal CLOCKOUT. Contents of the register are coupled to the $2^{nd}$ input of the adder 501. Therefore the value of the signal F2 is accumulated over time in register 502 at the rate determined by the signal CLOCKOUT. This generates a series of values in the register 502 representative of a time base for the periodic signal relative to the signal CLOCKOUT. Note that the adder 501 is allowed to overflow and therefore the series of values stored in register 502 are coupled to a Look-up Table (LUT) to transform this periodic sawtooth waveform into a sinusoid wave. The number of bits m stored in register 502 determines the precision of the average period while the number of bits k in the LUT determines the phase precision in each clock cycle. The average period (TAV) of the OUTPUT WAVEFORM is thus given by:

$$TAV=(2^m/F2)*TCLOCKOUT \qquad (3)$$

As can be seen in formula (3), the OUTPUT WAVEFORM period and frequency is a direct function of TCLOCKOUT. As explained above, for a given video line, the difference in the actual sync location and the expected sync location will create an error signal at the output of digital phase detector 204. This error signal is applied to the digital loop filter 214 and causes the signal CLOCKOUT to be sped up or slowed downed. As a result, all of the pulses generated by the video timing generator 208 are delayed or advanced by an amount DELT depending on the polarity of the error signal. Since CLOCKOUT is also used in the waveform generator 216, the OUTPUT WAVEFORM will also be shifted in time domain by an amount equal to DELT.

Again, the amount of time DELT the OUTPUT WAVEFORM is shifted is given by Formula (2). Combining Formulas (3) and (1) will produce:

$$TAV=(2^m/F2)*TCLOCKOUT=(2^m/F2)*(32-Q)*TAU \qquad (4)$$

The number of subcarrier cycles during the correction time DELT is given as:

$$NOFC=(DELT/TAV) \qquad (5)$$

Since one full cycle corresponds to 360 degrees of phase shift which is indistinguishable from no phase shift, the effective number of subcarrier cycles shifted is given by the fractional part of NOFSC. For example, for DELT=1.5 us and TAV=279 ns, DELT/TAV=5.37 and the effective number of cycles shifted is 0.37.

Since one period TAV of the output waveform corresponds to 360 degrees, a fractional cycle shift will correspond to a phase shift DELP, given as:

$$DELP=Fracof(DELT/TAV)*360=Fracof(B*TAU/((2^m*(32-Q)*TAU)/F2))*360=Fracof(B*F2/(2_m*(32-Q)))*360 \qquad (6)$$

It is possible to correct for DELP by sending a correction term PHQ with the required resolution. Since the inherent phase resolution in the OUTPUT WAVEFORM is determined by k (number of bits in LUT), the current embodiment uses k bits of accuracy in the correction term PHQ. Note that theoretically up to m bits of accuracy is possible.

Figure 6:
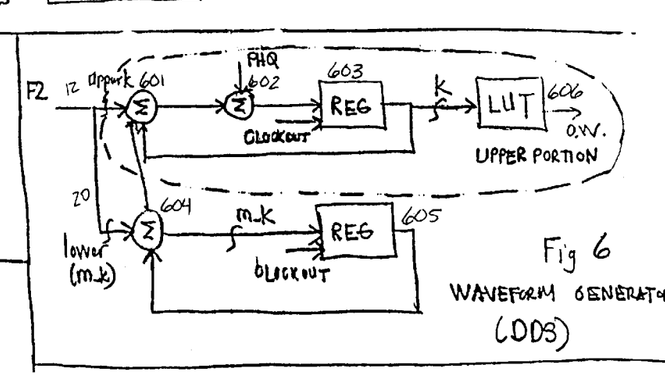
FIG. 6 illustrates a block schematic diagram of an alternative embodiment of the waveform generator(DDS) of the present invention.

First, the waveform generator 216 is modified as in FIG. 6. The correction term is calculated by observing the fact that a PHQ of $2^k$ added through 602 for one CLOCKOUT cycle will shift the OUTPUT WAVEFORM phase by 360 degrees. Hence, to undo a phase shift of DELP, one can send a correction therm PHQ which will shift the OUTPUT WAVEFORM by −DELP. Then, $$PHQ=(-DELP*2^k)/360=Fracof((-B*F2)/(2^m*(32-Q)))*2^k \quad (7)$$

Figure 7:
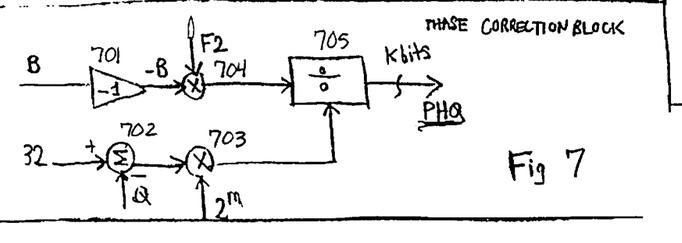
FIG. 7 illustrates a block schematic diagram of a phase correction block of the present invention.

A possible implementation of the correction term PHQ is done in the phase correction block in FIG. 7. If the result of the division at the output of 705 is expressed in binary, the first k-bits before the decimal point will form PHQ. Since the PHQ term will have to be calculated only once per video line, the multipliers and divider shown in FIG. 7 can have more than one clock cycle to finish the computation and can be implemented serially thereby reducing hardware complexity. In the current embodiment serial multiplier and dividers are used. For each line they compute PHQ before the start of chrominance subcarrier. That gives them about 5 us to finish the computation from the beginning of the line to the start of burst. The k-bits that form the phase correction term PHQ can be sent in parallel form to a waveform generator if it resides in the same circuit with the phase correction block, as will be the case with a video decoder. Otherwise, it can be serialized in the serializer 219 and sent to a second circuit which has its own waveform generator, as will be the case with a digital video encoder.

It will be readily apparent to one skilled in the art that other various modifications may be made to the preferred embodiment without departing from the spirit and scope of the invention as defined by the appended claims.

What is claimed is: application:

1. A method of stabilizing chrominance subcarrier generation in a video signal comprising the steps:
   a. calculating a time shift occurring in a video information signal of an output waveform;
   b. converting the time shift into an equivalent phase shift; and
   c. sending a phase correction number to a waveform generator block according to the equivalent phase shift.

2. The method according to claim 1 wherein the time shift is calculated for each video line.

3. The method according to claim 1 wherein calculating a time shift in an output waveform comprises:
   a. calculating DELT, the amount of time the output waveform is shifted; and
   b. calculating TAV, the average period of the output waveform.

4. The method according to claim 3 wherein the amount of time the output waveform is shifted DELT is given by:

$$DELT=B*TAU$$

where B is the sum of a sequence of digital numbers outputted by a limiter and TAU is a delay of one delay element.

5. The method according to claim 3 wherein the average period of the output waveform TAV is given by:

$$TAV=(2^m/F2)*((32-Q)*TAU)$$

where TAU is the delay of one delay element, F2 is the frequency control number from a subcarrier phase locked loop, Q is an average value of a clockout period and m is a number of bits stored in a register.

6. The method according to claim 1 wherein converting the time shift to an equivalent phase shift of the output waveform DELP is given by:

$$DELP=Fracof*((B*F2)/(2^m*(32-Q)))*360$$

where B is the sum of a sequence of digital numbers outputted by a limiter, F2 is the frequency control number from a subcarrier phase locked loop, Q is an average value of a clockout period, m is a number of bits stored in a register and Fracof is a fractional cycle shift.

7. The method according to claim 1 wherein sending a phase correction number PHQ to a waveform generator block according to the equivalent phase shift is given by:

$$PHQ=Fracof*((-B*F2)/(2^m*(32-Q)))*2^k$$

where k is the number of bits in a look up table, B is the sum of a sequence of digital numbers outputted by the limiter, F2 is the frequency control number from a subcarrier phase locked loop, Q is the average value of a clockout period, m is the number of bits stored in a register and Fracof is the fractional cycle shift.

8. The method according to claim 1 wherein the phase correction number will remove the phase shift from the output waveform.

9. The method according to claim 1 wherein the phase correction number will be sent to a waveform generator block according to the equivalent phase shift for each video line.

10. An apparatus for stabilizing chrominance subcarrier generation in a video signal, the apparatus comprising:
    a. a clock generator circuit;
    b. a digital phase detector;
    c. a digital loop filter Wherein the digital loop filter includes a K1 path and a K2 path;
    d. a waveform generator; and
    e. a phase correction block,
       wherein the K1 path outputs an integer portion of a CLOCKOUT signal and the K2 path outputs a fractional portion of the CLOCKOUT signal.

11. The apparatus of claim 10 wherein the apparatus comprises a serializer.

12. The apparatus of claim 10 wherein the clock generator circuit includes:
    a. an oscillator;
    b. a phase accumulator logic block;
    c. a multiplexor;
    d. a phase comparator; and
    e. a plurality of delay elements.

13. The clock generator circuit of claim 12 wherein the plurality of delay elements are coupled serially in a ring formation such that an output of the last delay element is coupled to the input of the first delay element.

14. The clock generator circuit of claim 12 wherein each of the plurality of delay elements have an identical delay time.

15. The clock generator circuit of claim 12 wherein the oscillator generates a CLOCKIN signal.

16. The clock generator circuit of claim 12 wherein the CLOCKIN signal is coupled with a first input of the phase comparator.

17. The clock generator circuit of claim 12 wherein the output of the plurality of delay elements is also coupled to a second input of the phase comparator.

18. The clock generator circuit of claim 12 wherein an output of the phase comparator is coupled with each of the plurality of delay elements in order to effectuate delay adjustment.

19. The clock generator circuit of claim 12 wherein an output of each of the plurality of delay elements is coupled with a corresponding input of the multiplexor.

20. The clock generator circuit of claim 12 wherein the CLOCKIN signal and the output of the last delay element are compared in the phase comparator.

21. The clock generator circuit of claim 12 wherein the phase comparator adjusts the delay of each of the plurality of delay elements such that a combined delay of the plurality of delay elements is equal to one cycle of the CLOCKIN signal.

22. The digital loop filter of claim 10 wherein a phase error for each video line coming from the digital phase detector is inputted into the K2 path that includes:

a. a first scaler;
b. a first summer;
c. a first limiter;
d. a first register; and
e. an accumulator block.

23. The K2 path of claim 22 wherein the first scaler multiplies the phase error by a constant K2.

24. The K2 path of claim 22 wherein the first summer sums an output of the first scaler with an output Q of the first register.

25. The K2 path of claim 22 wherein an output of the first summer is coupled with an input of the first limiter.

26. The K2 path of claim 22 wherein an output of the first limiter is coupled with an input of the first register.

27. The K2 path of claim 22 wherein the output Q of the first register is coupled with an input of the first summer.

28. The K2 path of claim 22 wherein the K2 path is split into an upper K2 path and a lower K2 path.

29. The K2 path of claim 22 wherein the lower bits from the output Q are coupled with the accumulator block of the lower K2 path.

30. The K2 path of claim 22 wherein the upper bits from the output Q are coupled with the upper K2 path.

31. The digital loop filter of claim 22 wherein the phase error for each video line coming from the digital phase detector is inputted into the K1 path that includes:

a. a second scaler;
b. a second limiter;
c. a second register;
d. a second summer; and
e. a third limiter.

32. The K1 path of claim 31 wherein the second scaler multiplies the phase error by a constant K1.

33. The K1 path of claim 31 wherein an output of the second scaler is coupled with an input of the second limiter.

34. The K1 path of claim 31 wherein an output B of the second limiter is coupled with a first input of the second register.

35. The K1 path of claim 31 wherein an output of the second register is coupled with an input of a third limiter.

36. The K1 path of claim 31 wherein the output of the second register is coupled with an input of a second summer.

37. The K1 path of claim 31 wherein the an output +/−L of the third limiter is coupled with the input of the second summer.

38. The K1 path of claim 31 wherein a sum of the second summer is coupled with a second input of the second register.

39. The digital loop filter of claim 31 wherein the output +/−L of the third limiter, the upper bits in the K2 path and an output OB of the accumulator block of the lower K2 path are coupled with an input of a third summer.

40. The digital loop filter of claim 39 wherein an output of the third summer is coupled with an input of a fourth limiter.

41. The digital loop filter of claim 40 wherein an output of the fourth limiter is coupled with an input of the phase accumulator logic block in the clock generator circuit.

42. The clock generator circuit of claim 12 wherein at least one output of the phase accumulator logic block is coupled with a corresponding input of the multiplexor.

43. The digital loop filter of claim 31 wherein the output B of the second limiter and the output Q of the first register are coupled with an input of the phase correction block.

44. The apparatus of claim 11 wherein an output PHQ of the phase correction block is coupled to either the serializer or the waveform generator.

45. The apparatus of claim 11 wherein an output of the serializer is coupled with the waveform generator.

* * * * *

UNITED STATES PATENT AND TRADEMARK OFFICE
CERTIFICATE OF CORRECTION

PATENT NO. : 6,741,289 B1
DATED : May 25, 2004
INVENTOR(S) : Bicakci

It is certified that error appears in the above-identified patent and that said Letters Patent is hereby corrected as shown below:

The title page showing illustrative figure should be deleted to be replaced with the attached title page.

Drawings sheets, consisting of Figs. 1-7, should be deleted to be replaced with the drawings sheets, consisting of Figs. 1-7, as shown on the attached pages.

<u>Title page,</u>
Item [73], Assignee, delete "FAIRCHILD SEMICONDUCTORS, INC." and insert
-- FAIRCHILD SEMICONDUCTOR, INC. --

Signed and Sealed this

Twenty-eighth Day of September, 2004

JON W. DUDAS
*Director of the United States Patent and Trademark Office*

(12) United States Patent
Bicakci (10) Patent No.: US 6,741,289 B1
(45) Date of Patent: May 25, 2004

(54) TECHNIQUE TO STABILIZE THE CHROMINANCE SUBCARRIER GENERATION IN A LINE-LOCKED DIGITAL VIDEO SYSTEM

(75) Inventor: Ara Bicakci, San Jose, CA (US)

(73) Assignee: Fairchild Semiconductors, Inc., South Portland, ME (US)

( * ) Notice: Subject to any disclaimer, the term of this patent is extended or adjusted under 35 U.S.C. 154(b) by 631 days.

(21) Appl. No.: 09/703,517

(22) Filed: Oct. 31, 2000

(51) Int. Cl.[7] ................................................. H04N 9/45
(52) U.S. Cl. ...................... 348/505; 348/194; 348/508
(58) Field of Search ................................ 348/194, 505, 348/508, 512, 549; 386/41, 13, 17, 19, 20

(56) References Cited

U.S. PATENT DOCUMENTS

| | | | |
|---|---|---|---|
| 4,370,672 A | * | 1/1983 | Ross et al. .................. 358/312 |
| 4,639,780 A | * | 1/1987 | Willis ........................... 358/150 |
| 4,694,327 A | * | 9/1987 | Demmer et al. .............. 358/19 |
| 4,697,207 A | * | 9/1987 | Lilley ........................... 358/17 |
| 4,718,074 A | | 1/1988 | Mannas et al. .............. 375/118 |
| 4,987,491 A | | 1/1991 | Kaite et al. .................. 358/166 |
| 4,989,073 A | * | 1/1991 | Wagner ........................ 358/19 |
| 5,132,554 A | | 7/1992 | Hiramatsu et al. ........... 307/269 |
| 5,179,438 A | * | 1/1993 | Morimoto ..................... 358/17 |
| 5,280,345 A | | 1/1994 | Uehara et al. ................ 358/37 |
| 5,303,061 A | | 4/1994 | Matsumoto et al. ......... 358/320 |
| 5,359,366 A | | 10/1994 | Ubukata et al. ............ 348/536 |
| 5,497,200 A | | 3/1996 | Otaki et al. .................. 348/497 |
| 5,557,335 A | | 9/1996 | Oh ............................... 348/512 |
| 5,796,796 A | | 8/1998 | Wang .......................... 375/372 |
| 5,877,640 A | | 3/1999 | Geerlings .................... 327/141 |
| 5,999,226 A | | 12/1999 | Choi ............................ 348/564 |
| 6,256,003 B1 | | 7/2001 | Tsuchiya et al. ............. 345/87 |
| 6,310,653 B1 | * | 10/2001 | Malcolm, Jr. et al. ...... 348/537 |
| 6,363,129 B1 | | 3/2002 | Agazzi ........................ 375/355 |

* cited by examiner

*Primary Examiner*—Victor R. Kostak
(74) *Attorney, Agent, or Firm*—Haverstock & Owens LLP (57) ABSTRACT

A technique to stabilize subcarrier generation in a line-locked digital video system, caused by simultaneous locking of the genlock device causing continuous changing of a shared clock signal, by calculating a time shift occurring in an output waveform, converting the time shift into an equivalent phase shift and sending a corresponding phase correction number to a waveform generator block to correct the time shift, and thus stabilize subcarrier generation.

45 Claims, 5 Drawing Sheets